United States Patent Office 2,724,419
Patented Nov. 22, 1955

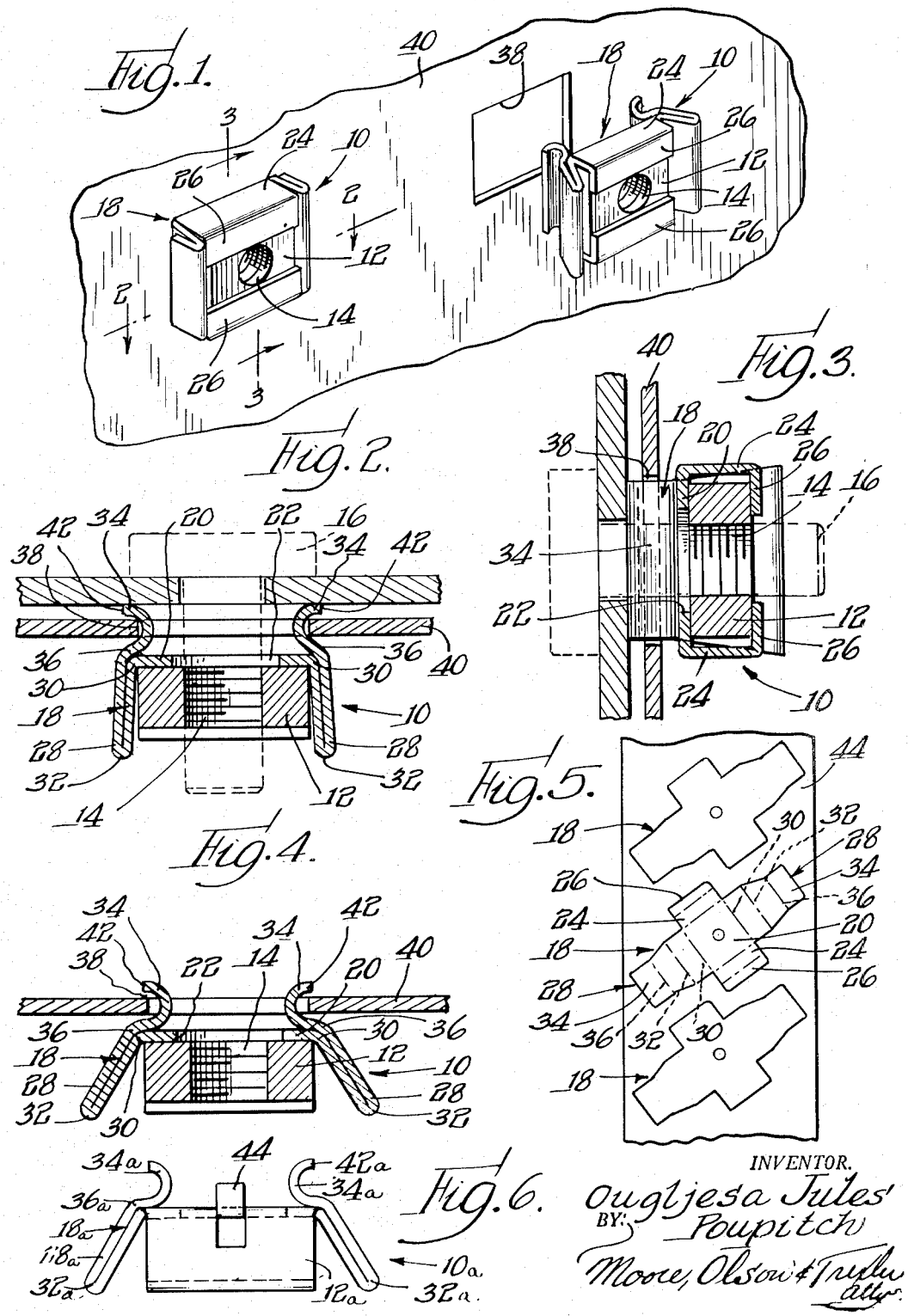

2,724,419

NUT CAGE DEVICE HAVING DEFORMABLE HOOKED ATTACHING WINGS

Ougljesa J. Poupitch, Itasca, Ill., assignor to Illinois Tool Works, Chicago, Ill., a corporation of Illinois Application June 25, 1952, Serial No. 295,529

1 Claim. (Cl. 151—41.74)

This invention relates generally to a nut cage, and more particularly to a nut cage adapted to be applied to an apertured work piece by permanently bending a sheet metal cage member after insertion within the work aperture.

Sheet metal nut members having sheet metal sections adapted to engage the threads of a screw frequently are snapped or otherwise secured within work apertures for retaining screws without the necessity of manually orienting the nut member during the screw inserting operation. Such sheet metal nut members are incapable of withstanding great axial forces on the screw, and accordingly sheet metal cages for holding solid nut members in place have been devised. The present invention contemplates a new and practical preassembled fastener unit in which a solid nut member is non-rotatably carried by a sheet metal retainer or cage member, wherein the cage member is inflexible so as to preclude accidental flexing which might inadvertently dislodge the fastener unit from position.

More specifically, this invention contemplates the provision of a preassembled fastener unit comprising a solid nut member and a sheet metal retainer or cage member wherein the fastener unit is insertable in an aperture in a work piece from one side of the work piece, a portion of the cage member thereafter being permanently bent or deformed from the same side of the work piece permanently to mount the fastener unit in position on the work piece.

An object of this invention is to provide a fastener unit of the foregoing character wherein the sheet metal retainer has a solid bend or hinge line, i. e. the hinge line is continuous from end to end providing an exceptionally strong structure.

A further object of this invention is to provide a nut cage affording better engagement with the surfaces of a work piece or panel in the vicinity of the aperture in which the cage is mounted.

A further object of this invention is to provide a nut cage wherein the nut retaining body portion and retaining members for fastening the nut cage on an apertured work piece are substantially independent of one another in size.

Yet another object of this invention to provide a nut cage affording folded over edges to be grasped in bending or deforming the nut cage and thereby avoiding the possibility of contact with rough edges.

Other objects and advantages of the present invention will be apparent from the following description when taken in connection with the accompanying drawings wherein:

Fig. 1 is a perspective view showing a nut and nut cage mounted in an apertured work panel and another nut and nut cage about to be mounted;

Fig. 2 is a cross-sectional view taken along the line 2—2 of Fig. 1;

Fig. 3 is a cross-sectional view along the line 3—3 of Fig. 1;

Fig. 4 is a view similar to Fig. 2 and showing the cage member before bending or deformation into permanently installed position;

Fig. 5 is a plan view showing the nut retainer blanks and the blank layout; and

Fig. 6 is an end view showing a modified form of cage member.

Referring now to the drawing, wherein like numerals have been employed to designate similar parts throughout the various figures, it will be seen that a preassembled nut and retainer member is designated generally by the numeral 10. This preassembly or fastener unit comprises a solid nut member 12 of substantially square configuration and internally threaded at 14 for receipt of a screw member as indicated in dashed lines at 16 in Figs. 2 and 3. The fastener unit 10 further includes a retainer member or nut cage 18 with which this invention is mainly concerned.

The retainer or nut cage 18 is formed from a single blank of sheet metal and comprises a main body 20 which is adapted to lie along the clamping face of the nut 12. The main body 20 is provided with a central circular aperture 22 somewhat larger in diameter than the threaded bore 14 of the nut 12. The main body 20 is provided along opposite edges with a pair of side flaps 24 adapted to lie along opposite edges of the nut and having edge flanges 26 adapted to overlie the end or face of the nut opposite the clamping face thereof to retain the nut against the main body 20.

The main body 20 is provided at opposite ends with a pair of wings 28 joined to the body along bend, hinge, or fold lines 30. The hinge lines are solid, that is they extend continuously from side to side of the main body with no discontinuities or interruptions. The metal of the nut cage thus is bent or folded over a considerable extent and no slots are present where cracks could start. This results in a strong structure which is very unlikely to break off and which is not susceptible to accidental flexing or bending which could result in unseating the fastener unit.

Each wing 28 is folded back upon itself at 32 and is provided at its extremity with a hook 34 reversely bent at 36 around the corresponding hinge line 30.

Before the fastener unit is inserted in an aperture 38 in a work piece or panel 40, the wings 28 are spaced angularly outwardly away from opposite sides of the nut as shown in Fig. 4 and at the right of Fig. 1. The tips 42 of the hooks are spaced apart slightly greater than the length of the aperture 38 so that it is necessary to tilt the fastener unit slightly in installing it and so that the hooks 34 will hold the fastener unit loosely in place before deformation of the nut cage for permanent assembly with the work panel. After the fastener unit is preliminarily installed by positioning the hooks loosely within the aperture 38 as just mentioned and as shown in Fig. 4, the outer ends of the wings 28 are forced toward one another by means such as a pair of pliers substantially into parallelism as shown in Fig. 2. This causes the wings to bend along the hinge lines 30 and to force the hooks into engagement with opposite edges of the aperture 38, the ends 42 of the hooks being spaced apart a considerable distance greater than the length of the aperture 38 whereby the hooks firmly and permanently secure the fastener unit against the work panel in the vicinity of the aperture 38.

As shown in Fig. 5, a succession of nut cage blanks 18 is stamped from a strip of sheet metal 44, the various parts and fold lines heretofore described being indicated on one of the blanks. The blanks are stamped out with their longer dimensions parallel to the grain of the metal, and the outer wing sections will be seen to be tapered from the fold lines 32 to the fold lines 36 to provide hooks 34 which are somewhat narrower than the main bodies 20.

A modified form of the nut cage or retainer member is shown in Fig. 6. This form is mainly identical with that described heretofore and similar parts are identified with similar numerals having the suffix "a" added to avoid the necessity of repeating the description. The sole difference in the modification shown in Fig. 6 resides in tabs 44 struck out of the side flaps 24a and reversely bent relative thereto substantially into parallelism therewith to facilitate positioning of the nut cage in the work panel aperture.

As noted heretofore the solid hinge line affords no slots where cracks readily might start. The sheet metal of the nut cage is surface treated to resist corrosion and is hardened after formation. The hardness, coupled with the relatively great length of the hinge line along which the metal must bend precludes accidental flexing of the wings which might inadvertently dislodge the fastener unit from screw receiving positioning. The double thickness of the wings allows the hook portion to be bent about the hinge line to insure better engagement of the hook with the surfaces of the work panel in the vicinity of the aperture. Since the hooks are not connected directly along the hinge line at the ends of the main body, the main body and hooks are substantially independent as to size, thus allowing the use of a relatively large nut overlying the side edges of the aperture if desired.

The folded upper edges of the wings as brought about by the folded or double construction of the wings provides smooth upper edges rather than rough edges such as might be present were the upper edges of the wings sheared by a punch press. The lack of any relatively reversely bent portions at the corners between the side flaps and the wings minimizes the danger of cracking at that point. Furthermore, the extension of the wings and side flaps generally in the same direction provides a contact along all four edges or sides of the nut and further provides contact on the clamping face of the nut around the entire periphery thereof.

Although the two particular embodiments of my invention have been shown, it will be understood that these are by way of illustration and not of limitation. The invention includes all that which falls fairly within the spirit and scope of the appended claim.

I claim:

A fastener unit comprising a coupled nut member and sheet metal retainer therefor, said retainer including an apertured body portion abutting one end of the nut member around the aperture therethrough, flange means extending from opposite margins of said body portion and terminating in portions overlying portions of the opposite end of the nut member for permanently connecting the nut member to the retainer, a pair of wings flaring outwardly from other opposite margins of said body portion and generally toward the said opposite end of the nut member, each of said wings including inner and outer sections substantially folded together in double thickness, the inner section of each wing being joined to the body portion substantially throughout the extent of the adjacent edge of the body portion to provide a continuous uninterrupted bendable hinge connection between the wings and body portion, and each wing including a hook portion integral with the outer section and projecting in the opposite direction from said wings, said wings being shiftable inwardly into close proximity with the nut member by bending along the continuous bendable connection with the body portion to spread said hook portions outwardly for engagement with a complementary workpiece.

References Cited in the file of this patent
UNITED STATES PATENTS

| | | |
|---|---|---|
| 1,768,505 | Carr | June 24, 1930 |
| 2,079,917 | Mitchel | May 11, 1937 |
| 2,460,722 | Waara | Feb. 1, 1949 |
| 2,476,207 | Brown | July 12, 1949 |
| 2,678,075 | Murphy | May 11, 1954 |